United States Patent
Farr et al.

(10) Patent No.: US 7,551,903 B2
(45) Date of Patent: Jun. 23, 2009

(54) REFLECTING MODULATOR CIRCUIT COMPRISING A NEGATIVE IMPEDANCE AMPLIFIER

(76) Inventors: Adrian N Farr, The Mill House, Bran End, Stebbing, Dunmow, Essex (GB) CM6 3RS; Ian J Forster, 31 Great Cob, Springfield, Chelmsford, Essex (GB) CM1 6LA ( * ) Notice: Subject to any disclaimer, the term of this patent is extended or adjusted under 35 U.S.C. 154(b) by 83 days.

(21) Appl. No.: 11/434,571

(22) Filed: May 15, 2006

(65) Prior Publication Data

US 2006/0279370 A1 Dec. 14, 2006

Related U.S. Application Data

(63) Continuation of application No. 10/019,140, filed as application No. PCT/GB00/02200 on Jun. 7, 2000, now Pat. No. 7,046,957.

(30) Foreign Application Priority Data

Jun. 25, 1999 (GB) .................................. 9914941.1

(51) Int. Cl.
*H04B 7/15* (2006.01)

(52) U.S. Cl. ......................... 455/106; 455/41.2; 342/44; 375/308; 375/312; 375/315

(58) Field of Classification Search ................ 455/41.2, 455/42, 106, 107; 340/10.1; 342/42, 44, 342/50; 375/279, 302, 308, 312, 315, 333

See application file for complete search history.

(56) References Cited

U.S. PATENT DOCUMENTS

| | | | |
|---|---|---|---|
| 4,075,632 A | 2/1978 | Baldwin | |
| 5,173,705 A * | 12/1992 | Camiade et al. | 342/42 |
| 5,305,469 A * | 4/1994 | Camiade et al. | 455/78 |
| 5,311,186 A | 5/1994 | Utsu | |
| 5,313,211 A * | 5/1994 | Tokuda et al. | 342/50 |
| 5,640,687 A * | 6/1997 | Meron et al. | 455/83 |
| 5,649,295 A | 7/1997 | Shober | |
| 5,822,685 A | 10/1998 | Forster | |
| 6,046,668 A | 4/2000 | Forster | |
| 7,046,957 B1 * | 5/2006 | Farr et al. | 455/11.1 |

FOREIGN PATENT DOCUMENTS

| | | |
|---|---|---|
| DE | 1 912 852 | 10/1970 |
| EP | 0 288 035 A2 | 10/1988 |
| EP | 0 324 564 A2 | 7/1989 |
| GB | 2 284 323 A | 5/1995 |
| JP | 57-111158 A | 7/1982 |
| JP | 61-257050 A | 11/1986 |
| JP | 63-198452 A | 8/1988 |
| JP | 6-104945 A | 4/1994 |

* cited by examiner

*Primary Examiner*—Blane J Jackson
(74) *Attorney, Agent, or Firm*—Christensen O'Connor Johnson Kindness PLLC

(57) ABSTRACT

A modulator circuit comprises a negative impedance amplifier which is operable such that a signal applied to the amplifier is reflected and amplified. Switching means are provided for switching the impedance of the amplifier between two reflecting states such that the reflected and amplified signal is phase modulated. The impedances of the negative impedance amplifier are selected such that the phase of the reflected and amplified signal in the first reflecting state differs substantially from the phase of the reflected and amplified signal in a second reflecting state. For example, the phase switches by substantially 180 degrees. Preferably the impedances of the negative impedance amplifier in the two reflecting states are selected such that the reflection gain of the amplifier in the two reflecting states is substantially the same such that the reflected and amplified signal is a binary phase shift keyed.

35 Claims, 3 Drawing Sheets

REFLECTING MODULATOR CIRCUIT COMPRISING A NEGATIVE IMPEDANCE AMPLIFIER

FIELD OF DISCLOSURE

This invention relates to a modulator circuit and more especially to such a circuit for generating binary phase shift key modulation.

BACKGROUND

Modulation, which can be broadly defined as a time varying modification of a signal to impart information thereto, is a crucial feature of the design of almost all radio based systems. An effective and well known form of modulation for digital signals, is binary phase shift keying (BPSK). In BPSK one of the two digital states of information is imparted onto a carrier signal by modulating its phase to have two discrete values which are generally separated by 180 degrees ($\pi$ radians). Whilst such a modulation technique may be efficient it has not previously been ideally suited for applications where low cost and low power consumption are paramount such as in tagging systems, since the known circuitry for generating BPSK is complex and consumes too much electrical power for operation from a finite battery supply.

The present invention has arisen in an endeavour to provide a modulator circuit which at least in part overcomes the limitations of the known modulators and which is suitable for use in a tagging systems or other applications where low power consumption and circuit simplicity are of importance.

BRIEF SUMMARY

According to the present invention a modulator circuit comprises: a negative impedance amplifier operable such that a signal applied to the amplifier is reflected and amplified and switching means for switching the impedance of the amplifier between two reflecting states, characterised in that the impedances in the two reflecting states are selected such that the phase of the reflected and amplified signal switches by substantially 180 degrees.

Preferably the impedances in the two reflecting states are selected such that the reflection gain of the amplifier in the two reflecting states is substantially the same such that the reflected and amplified signal is a binary phase shift keyed.

Alternatively the impedances in the two reflecting states are selected such that the reflection gain of the amplifier in the two reflecting states is different and wherein said impedances are selected such the reflected and amplified signal is a substantially single sideband signal.

In a particularly preferred embodiment the negative impedance amplifier comprises a transistor, such as for example a bipolar or field effect transistor, and biasing means for biasing the transistor such as to act as a negative impedance amplifier. Such a modulator circuit is found to be particularly advantageous since it in essence can comprise only a single component. Furthermore, a negative impedance amplifier is capable of providing high gain at very low current, so its power consumption can accordingly be very low of the order of a few micro-amps. Conveniently when using a transistor the switching means switches the biasing of the transistor to switch the transistor between the two reflecting states.

Advantageously the modulator circuit further comprises an antenna for receiving radiation and converting it to the signal applied to the amplifier and for radiating the reflected and amplified signal.

According to a second aspect of the invention there is provided a demodulator circuit for demodulating a Binary phase shift keyed signal which incorporates the modulator circuit described above.

According to a third aspect of the invention there is provided a transponder tag which incorporates the modulator circuit described above.

A modulator circuit in accordance with the invention will how be described by way of example only with reference to the accompanying drawings in which:

DETAILED DESCRIPTION

Figure 1:
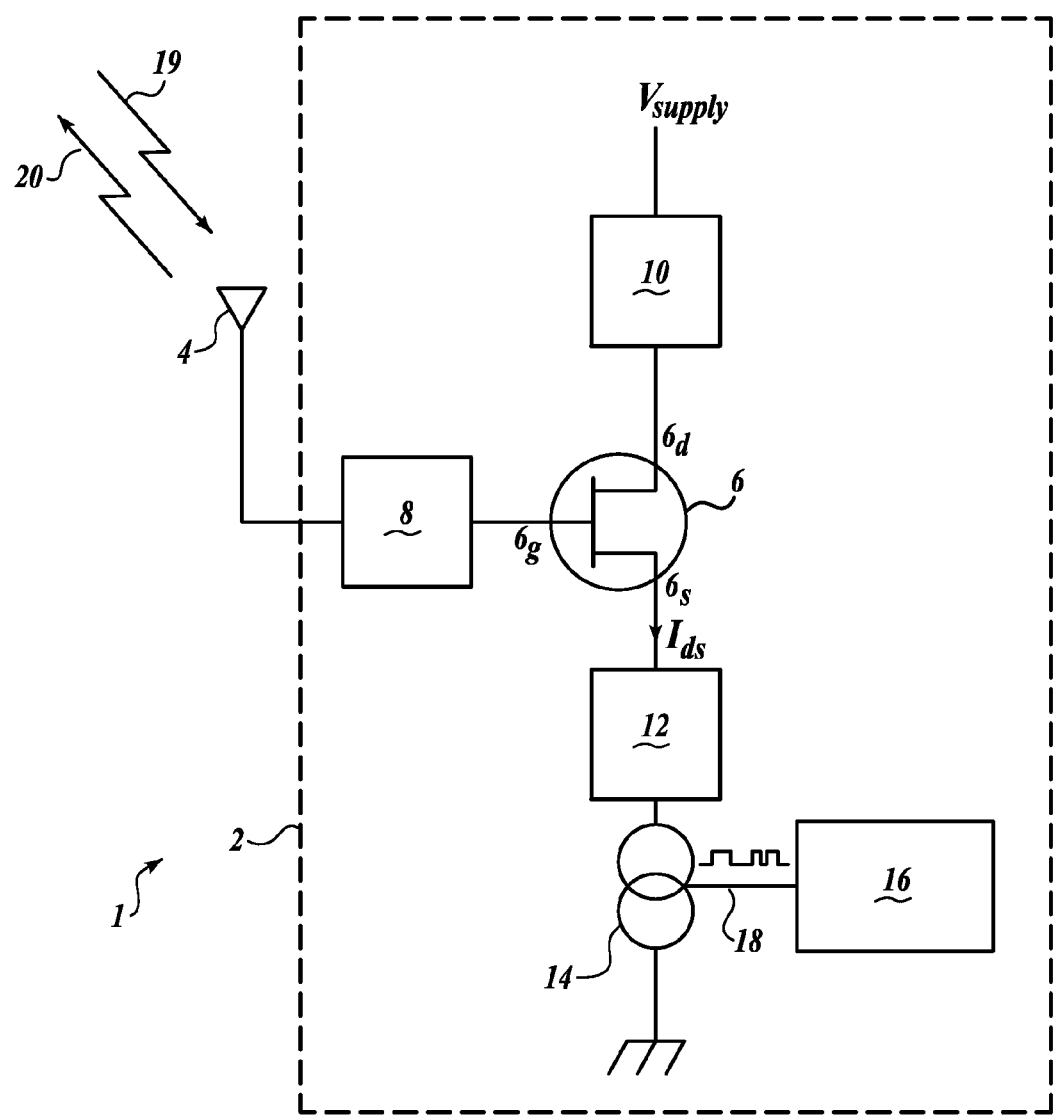
FIG. 1 is a schematic representation of a transponder circuit which incorporates a modulator circuit in accordance with the invention.

Referring to FIG. 1 there is shown a microwave frequency (2.45 GHz) pseudo passive transponder tag 1 for use in a tagging system which incorporates a modulator circuit 2 in accordance with the invention. The tag 1 comprises an antenna 4 which is connected to the modulator circuit 2. The modulator circuit 2 comprises: a gallium arsenide (GaAs) field effect transistor (FET) 6, impedance matching/feedback networks 8, 10, 12 connected to a respective transistor terminal, a switchable current source 14 and a control circuit 16. The antenna 4, which for operation at microwave frequencies conveniently comprises a patch antenna, is connected to the gate electrode $6_g$ of the FET 6 via the matching network 8 which conveniently comprises a transmission line element. The drain electrode $6_d$ of the FET 6 is connected to a positive supply $V_{supply}$ by the matching network 10. The source electrode $6_s$ connected to ground via the matching network 12 and the switchable current source 14. The current source 14 is controlled by the control circuit 16 via a control line 18.

In a known manner the FET 6 is biased by a biasing network which comprises the matching/feedback networks 8, 10, 12 such that it operates in a linear relatively high gain region of its current/voltage characteristic. Conveniently each of the networks 8,10,12 comprises a transmission line element. The FET 6 thus amplifies and reflects any signal appearing at its gate electrode $6_g$ and therefore acts as a negative impedance amplifier. This being said, it will be appreciated that in most applications the impedance of the amplifier is primarily resistive.

The magnitude of the negative impedance of the modulator circuit 2 is dependent on the drain/source current $I_{ds}$ passing through the transistor 6, and this current is determined by the switchable current source 14. The current source 14 is switchable between two selected currents $I_{ds1}$ and $I_{ds2}$ in dependence upon control circuit 16. For both currents $I_{ds1}$ and $I_{ds2}$, the FET 6 operates as a negative impedance amplifier, though for each current the magnitude of its negative impedance is different.

In operation of the circuit 1 the antenna 4 receives and converts microwave radiation 19 into an electrical signal which is applied via the matching network 8 to the gate $6_g$ of the FET 6. As described above the FET 6 acts as a negative impedance amplifier and the electrical signal is reflected and amplified by the FET 6 and re-radiated as microwave radiation 20 from the antenna 4. In the case of tagging systems the microwave radiation 19 is an interrogating radiation signal which can be a continuous wave or modulated wave signal. To impart information to the radiation 20 the control circuit 16 switches between the two currents $I_{ds1}$ and $I_{ds2}$ such that the phase of the radiation 20 switches by 180 degrees. An important feature of the invention is the selection of the magnitude of the negative impedance of the circuit 2 for the two currents $I_{ds1}$ and $I_{ds2}$. These are selected such that (i) the circuit has the same reflection gain for each current and (ii) the phase between the reflected and amplified signal for the two currents is switched by 180 degrees. The reflection gain (in decibels dB) of the circuit 1 as seen looking toward the gate terminal $6_g$ is given by:

$$\text{gain} = 20 \log \left| \frac{Zn - Zo}{Zn + Zo} \right|$$

where Zo is the antenna impedance (or in the case where no antenna is present, it is the system impedance) and Zn is the input impedance presented by the FET 6 (that is the negative impedance looking towards the gate $6_g$). For the embodiment shown in FIG. 1 the system/antenna impedance is nominally 50 ohms and the value of the negative impedance is switchable between −45 and −55.555 ohms for $I_{ds1}$ and $I_{ds2}$ respectively to give a reflection gain in each case of 25 dB. It is to be noted that for these impedance values whilst the reflection gain is constant, the phase of the reflected and amplified signals will be altered by 180 degrees. This change of phase is indicated by the change of the sign of the term $(Zn-Zo) \div (Zn+Zo)$. Thus for the example of FIG. 1 $I_{ds1}$ is selected such that the FET 6 operates as a negative impedance of −45 ohms and $I_{ds2}$ is selected such that the FET 6 operates as negative impedance of −55.555 ohms. It will be appreciated therefore that the circuit 2 acts as a binary phase shift key reflective modulator. A particular advantage of the modulator circuit 2 is that it provides a simple method of generating BPSK and offers the additional benefit that it also amplifies the signal which it is modulating. Due to the circuit's simplicity it is ideally suited to tagging applications where it further has the advantage that it is capable of operating at very low currents (of the order of a few micro-amps) for an operating frequency of 2.4 GHz.

With different values for the respective impedances, both the magnitude and phase of the reflected signal can be varied between the two states, such that a combination of amplitude modulation (AM) and phase modulation (PM) can be applied. With an appropriate combination of the two forms of modulation the radiated signal 20 can be arranged to be a substantially single sideband signal.

Figure 2:
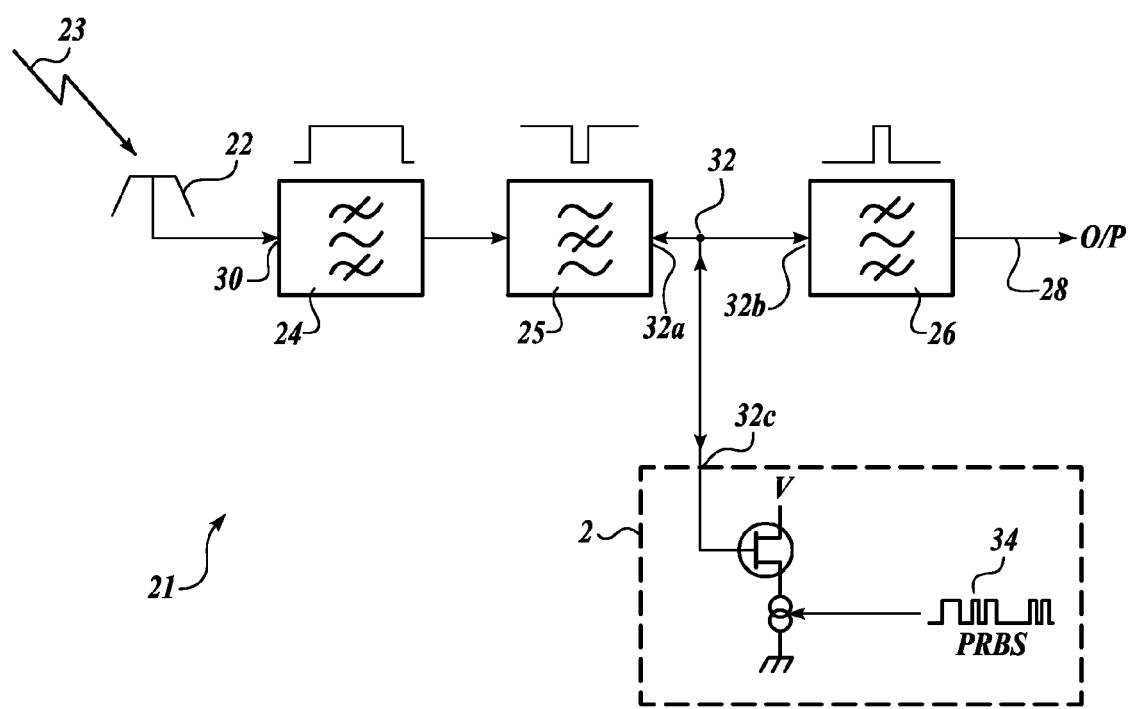
FIG. 2 is a schematic representation of a de-spreader circuit for use in a spread spectrum communication system which incorporates the modulator circuit of FIG. 1.

Referring to FIG. 2 there is shown a schematic of a de-spreader circuit 21 for use in a spread spectrum communication system such as for example of the type used in a global positioning system. As is known in such spread spectrum systems a carrier signal is modulated with a digital code, most often a pseudo random binary sequence (PRBS), to spread its energy spectra. Commonly the modulation used is BPSK. The circuit 21 is intended for de-spreading such spread spectrum radiation to recover the original carrier signal and any modulation applied thereto. This is achieved by using the modulator 2 of FIG. 1 to apply a replica of the sequence used to generate the spread spectrum. It will be appreciated that the sequence applied by the circuit 21 is additionally in time synchronisation with the generating sequence.

The circuit 21 comprises; an antenna 22 for receiving broad band spread spectrum radiation 23, a broad pass-band filter 24, a narrow stop-band filter 25, a narrow pass-band filter 26 and a modulator circuit 2. The broad pass-band filter 24, narrow stop-band filter 25 and narrow pass-band filter 26 are connected in series and the output 28 of the narrow pass-band filter 26 provides the output 28 of the circuit 21. The antenna 22 is connected to the input 30 of the broad band filter 24. The modulator circuit 2, which is identical to the circuit shown in FIG. 1, is connected to the interconnection 32 of the filters 25 and 26.

The reflective modulator circuit 2 has a gain of 20 dB in both reflecting states. The reflecting state of the modulator 2 is controlled by a digital signal 34, which as described above is a replica of the original sequence signal used to generate the broad band signal 23. Most typically the signal 34 is a PRBS signal.

In operation the broad band spread radiation 23 is received and converted to an electrical signal by the antenna 22 and passes through the broad pass-band filter 24 and narrow stop-band filter 25. The pass-band of the filter 24 defines the bandwidth of operation of the circuit 21. The centre frequency of the stop-band filter 25 is selected to correspond with the carrier frequency of the radiation 23 to block any components at the carrier frequency. The filtered signal appearing at the output 32a of the filter 25 is applied to both the input 32b of the narrow pass-band filter 26 and to the input 32c of the modulator 2. Due to the pass-band pass characteristic of the narrow band-pass filter 26 the filtered signal is blocked by the filter 26. The filtered signal however appearing at the input 32c of the modulator circuit 2 is de-modulated to produce an amplified version of the original carrier signal which is reflected back to the interconnection 32. The amplified carrier signal, which is within the band pass characteristic of the narrow pass-band filter 26, passes through substantially unattenuated to the output 28. The demodulated signal is prevented from returning to the antenna 22 by the stop-band filter 25. The circuit 20 thus operates as a de-spreader circuit and is capable of operating at substantially lower currents than those which currently use digital techniques.

A further example of an application of the reflector modulator in accordance with the invention is now described with reference to FIG. 3 which is a schematic of a spread spectrum communication system 40 for use in covert communications between a transmitter 42 and a hand held radio receiver 44. As is known spreading the spectra of the transmitted signal, and hence spreading the energy over a large frequency range, makes it more difficult for the signal to be detected by unauthorised persons and hence for such persons to determine the position of the transmitting source.

Figure 3:
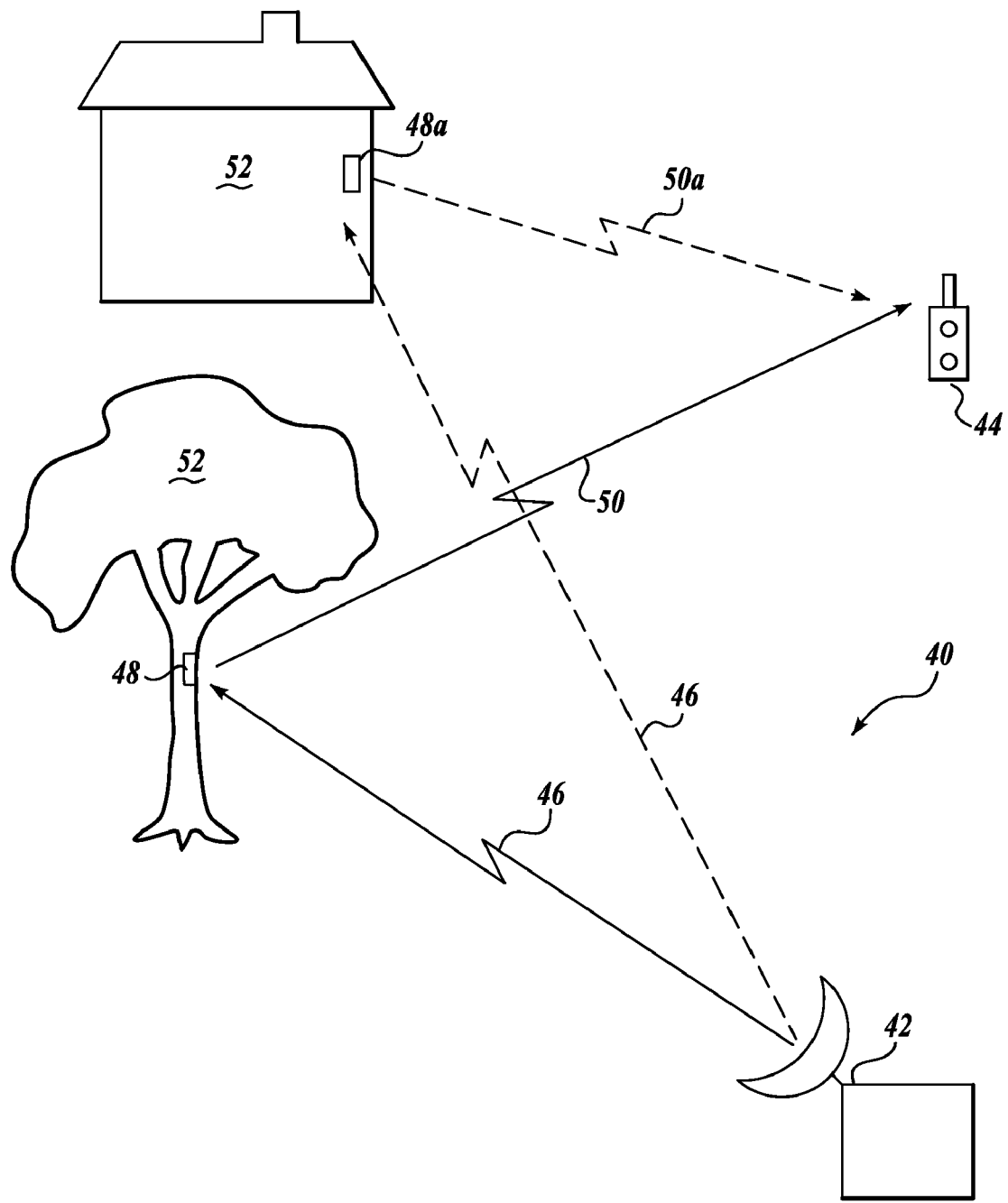
FIG. 3 is a schematic representation of a spread spectrum communication system incorporating the modulator circuit of FIG. 1.

Referring to FIG. 3 the communication system 40 comprises: a spread spectrum transmitter 42 of a known type which generates a BPSK modulated broad band spread spectrum radiation 46, a reflective de-spreading circuit 48 and a hand held radio receiver 44. The de-spreader circuit 48 is identical to the transponder circuit 1 of FIG. 1 in which the control circuit 16 switches the transistor 6 using an identical code to that used by the transmitter 42 to generate the spread signal 46. The de-spreader circuit 48 thus receives the broad band radiation 46 and in response radiates an amplified and de-spread narrow band radiation 50 which represents the recovered carrier of the signal 46 and any modulation applied thereto. The narrow band radiation 50 is detected by the hand held radio receiver 44. The de-spreading circuit 48 is preferably mounted at a high point such as on the side of a building 52 or other structure such as a post or a tree. Since the radiation 46 generated by the transmitter 42 is broad band this makes it difficult for a direction finding receiver to locate the position of the transmitter 42. Although such a direction finding receiver may be able to locate the narrow band radiated emissions 50 from the de-spreading circuit 48 and hence determine its position, it will still be unable to determine the position of the transmitter 42. In a preferred communication system a number of de-spreading circuits 48 (a second such circuit 48a is shown in FIG. 3), each having a different modulation code, are located at different physical locations. The transmitter 42 is operable to switch between the different modulating codes during communication with the hand held radio 44 such that different de-spreading circuits 48 become activated. As a result the position from which the narrow band radiation 50, 50a originates will jump from de-spreading circuit 48 to de-spreading circuit 48a, thereby hampering any attempt to locate the position of the de-spreading circuit.

It will be appreciated that modifications can be made to the circuits described which are still within the scope of the invention. For example whilst in the examples described the modulator circuit uses a field effect transistor, which is much preferred for operation of microwave frequencies, the negative impedance amplifier can be implemented in different ways, depending upon the required frequency of operation, such as for example using a bi-polar transistor or other active devices. Furthermore the modulator circuit of the invention is not restricted to the applications described and is suited for use in any application which requires BPSK modulation. The present invention resides in the realisation that binary phase shift key modulation can be achieved by using a reflection amplifier and switching the circuit between two reflecting states which preferably have the same reflection gain (though this is not essential when single sideband operation is required), but which change the phase of the reflected signal by substantially 180 degrees.

The invention claimed is:

1. A modulator circuit comprising:
   a negative impedance amplifier configured to reflect and amplify a signal applied to the negative impedance amplifier; and
   a switching circuit configured to switch the impedance of the negative impedance amplifier between two reflecting states, wherein the impedance of the negative impedance amplifier in a first reflecting state is selected such that the phase of the reflected and amplified signal in the first reflecting state differs substantially from the phase of the reflected and amplified signal in a second reflecting state.

2. The modulator circuit of claim 1, wherein the impedance of the negative impedance amplifier in the first and second reflecting states is further selected such that a reflection gain of the negative impedance amplifier in the two reflecting states is substantially the same and such that the reflected and amplified signal is a binary phase shift keyed (BPSK) signal.

3. The modulator circuit of claim 1, wherein the impedance of the negative impedance amplifier in the first and second reflecting states is further selected such that a reflection gain of the negative impedance amplifier in the two reflecting states is different and such that the reflected and amplified signal is a substantially single sideband signal.

4. The modulator circuit of claim 1, wherein the negative impedance amplifier comprises a transistor and a biasing network configured to bias the transistor to act as the negative impedance amplifier.

5. The modulator circuit of claim 4, wherein the switching circuit comprises a current source configured to switch the impedance of the negative impedance amplifier between the two reflecting states.

6. The modulator circuit of claim 5, wherein the current source is further configured to switch between two selected drain/source currents as directed by a control circuit coupled with the current source such that the phase of the reflected and amplified signal in the two reflecting states switches by substantially 180 degrees.

7. The modulator circuit of claim 4, wherein the transistor comprises a bipolar transistor.

8. The modulator circuit of claim 4, wherein the transistor comprises a field effect transistor.

9. The modulator circuit of claim 1, wherein the modulator circuit is configured to operate in a transponder tag that responds to an interrogating signal.

10. The modulator circuit of claim 1, further comprising an antenna configured to receive and convert radiation into the signal applied to the amplifier and to radiate the reflected and amplified signal.

11. A de-modulator circuit for de-modulating a binary phase shift keyed signal, comprising:
   a modulator circuit including a negative impedance amplifier configured to reflect and amplify a signal applied to the negative impedance amplifier; and
   a current source configured to switch the amplifier between two reflecting states, wherein the impedance of the negative impedance amplifier in the two reflecting states is selected such that a phase of a signal that is reflected and amplified by the negative impedance amplifier switches by substantially 180 degrees.

12. A de-spreader circuit for de-spreading broad band spread spectrum radiation to recover an original carrier signal, the de-spreader circuit comprising:
   an antenna configured to receive broad band spread spectrum radiation;
   a broad pass-band filter coupled to the antenna, wherein the broad pass-band filter has a pass-band that defines a bandwidth of operation for the de-spreader circuit;
   a narrow stop-band filter coupled to the broad pass-band filter, wherein the narrow stop-band filter has a center frequency selected to correspond with a carrier frequency of the broad band spread spectrum radiation;
   a narrow pass-band filter coupled to the narrow stop-band filter, wherein the narrow pass-band filter has an output that provides an output of the de-spreader circuit; and
   a modulator circuit connected to the coupling of the narrow stop-band filter and the narrow pass-band filter, wherein the modulator circuit is configured to be controlled by a replica of an original sequence signal that was used to generate the broad band spread spectrum radiation.

13. The de-spreader circuit of claim 12, wherein the original sequence signal is a pseudo random binary sequence (PRBS) signal.

14. The de-spreader circuit of claim 12, wherein the modulator circuit comprises:
   a negative impedance amplifier configured to reflect and amplify a signal applied to the negative impedance amplifier; and
   a switching circuit configured to switch the impedance of the negative impedance amplifier between first and second reflecting states;
   wherein the impedance of the negative impedance amplifier in the first reflecting state is selected such that the phase of the reflected and amplified signal in the first reflecting state differs substantially from the phase of the reflected and amplified signal in a second reflecting state.

15. The de-spreader circuit of claim 14, wherein the modulator circuit is further configured to de-modulate a signal input to produce an amplified version of the original carrier signal, and wherein the amplified version of the original carrier signal is reflected back to the coupling of the narrow stop-band filter and the narrow pass-band filter.

16. The de-spreader circuit of claim 15, wherein the de-spreader circuit is configured to pass the amplified version of the original carrier signal through the narrow pass-band filter substantially unattenuated.

17. The de-spreader circuit of claim 16, wherein the narrow stop-band filter is configured to prevent the amplified version of the original carrier signal from returning to the antenna.

18. The de-spreader circuit of claim 12, wherein the antenna is further configured to convert the broad band spread spectrum radiation into an electrical signal that passes through the broad pass-band filter and the narrow stop-band filter.

19. A method for de-spreading broad band spread spectrum radiation to recover an original carrier signal, the method comprising:
receiving, via an antenna, broad band spread spectrum radiation generated from an original carrier signal modulated with a digital modulation code;
converting the broad band spread spectrum radiation into an electrical signal;
de-modulating and reflectively amplifying the electrical signal using a negative impedance amplifier to produce an amplified version of the original carrier signal; and
outputting the amplified version of the original carrier signal while preventing the amplified version of the original carrier signal from returning to the antenna that received the broad band spread spectrum radiation.

20. The method of claim 19, wherein said de-modulating and reflectively amplifying the electrical signal comprises:
selectively switching the negative impedance amplifier between a first reflecting state and a second reflecting state, wherein for the first reflecting state the negative impedance amplifier amplifies and reflects the electrical signal at a first phase, and wherein for the second reflecting state the negative impedance amplifier amplifies and reflects the electrical signal at a second phase that is substantially different from the first phase; and
controlling the negative impedance amplifier using a replica of an original sequence signal that was used to generate the broad band spread spectrum radiation, thereby recovering the original carrier signal.

21. The method of claim 19, further comprising filtering the electrical signal through a broad pass-band filter and a narrow stop-band filter prior to said de-modulating and reflectively amplifying the electrical signal.

22. A spread spectrum communication system comprising:
a transmitter configured to generate binary phase shift keyed (BPSK) modulated broad band spread spectrum radiation;
a first de-spreader circuit including a negative impedance amplifier configured to reflect and amplify a signal applied to the negative impedance amplifier; and
a switching circuit configured to switch the impedance of the negative impedance amplifier between first and second reflecting states;
wherein the impedance of the negative impedance amplifier in the first reflecting state is selected such that the phase of the reflected and amplified signal in the first reflecting state differs substantially from the phase of the reflected and amplified signal in the second reflecting state.

23. The spread spectrum communication system of claim 22, wherein in response to receiving the broad band spread spectrum radiation, the first de-spreader circuit is configured to generate amplified and de-spread narrow band radiation using a first digital modulation code that is a replica of a first original sequence signal that was used by the transmitter to generate the broad band spread spectrum radiation, and wherein the amplified and de-spread narrow band radiation represents a recovered original signal of the broad band spread spectrum radiation.

24. The spread spectrum communication system of claim 23, further comprising a second de-spreader circuit, wherein in response to receiving the broad band spread spectrum radiation, the second de-spreader circuit is configured to generate amplified and de-spread narrow band radiation using a second digital modulation code that is a replica of a second original sequence signal that was used by the transmitter to generate the broad band spread spectrum radiation, and wherein the amplified and de-spread narrow band radiation represents the recovered original signal of the broad band spread spectrum radiation.

25. The spread spectrum communication system of claim 24, further comprising a receiver configured to detect the amplified and de-spread narrow band radiation generated by both the first de-spreader circuit and the second de-spreader circuit.

26. The spread spectrum communication system of claim 25, wherein the transmitter is further configured to switch between the first and the second digital modulation code, and wherein the first de-spreader circuit and the second de-spreader circuit are located at different physical locations.

27. A method for coven communications between a transmitter and a receiver, the method comprising:
at a first de-spreader circuit, in response to receiving broad band spread spectrum radiation generated by the transmitter using a first original sequence signal, generating an amplified and de-spread narrow band radiation representing a recovered original signal of the broad band spread spectrum radiation; and
at a second de-spreader circuit, in response to receiving the broad band spread spectrum radiation generated by the transmitter using a second original sequence signal, generating the amplified and de-spread narrow band radiation representing the recovered original signal of the broad band spread spectrum radiation;
wherein each of the first de-spreader circuit and the second de-spreader circuit includes a negative impedance amplifier configured to reflect and amplify a signal applied to the negative impedance amplifier.

28. The method of claim 27, wherein the first de-spreader circuit and the second de-spreader circuit are located at different physical locations.

29. The method of claim 28, further comprising:
at a receiver, detecting the amplified and de-spread narrow band radiation generated by the first de-spreader circuit and the second de-spreader circuit, wherein the narrow band radiation represents the recovered original signal of the broad band spread spectrum radiation.

30. The method of claim 29, further comprising switching, by the transmitter, between the first original sequence signal and the second original sequence signal during transmission of the broad band spread spectrum radiation.

31. The method of claim 28, further comprising:
convening the broad band spread spectrum radiation into an electrical signal; and
filtering the electrical signal.

32. The method of claim 31, wherein said generating the amplified and de-spread narrow band radiation further comprises:
- selectively switching the negative impedance amplifier between a first reflecting state and a second reflecting state, wherein for the first reflecting state the negative impedance amplifier amplifies and reflects the electrical signal at a first phase, and wherein for the second reflecting state the negative impedance amplifier amplifies and reflects the electrical signal at a second phase that is substantially different from the first phase; and
- controlling said selectively switching using a first digital modulation code.

33. The method of claim 32, further comprising controlling said selectively switching using a second digital modulation code.

34. The method of claim 33, wherein the first digital modulation code is a replica of the first original sequence signal used by the transmitter and the second digital modulation code is a replica of the second original sequence signal used by the transmitter.

35. The method of claim 34, wherein the first and second original sequence signals are pseudo random binary sequence (PRBS) signals.

* * * * *

UNITED STATES PATENT AND TRADEMARK OFFICE
CERTIFICATE OF CORRECTION

| | |
|---|---|
| PATENT NO. | : 7,551,903 B2 |
| APPLICATION NO. | : 11/434571 |
| DATED | : June 23, 2009 |
| INVENTOR(S) | : A. N. Farr et al. |

Page 1 of 1

It is certified that error appears in the above-identified patent and that said Letters Patent is hereby corrected as shown below:

| On the title page (*) | Notice | after "83 days." insert --This patent is subject to a terminal disclaimer.-- |
| Col. 8 (Claim 27, | 32 line 1) | "coven" should read --covert-- |

Signed and Sealed this

Second Day of February, 2010

David J. Kappos
*Director of the United States Patent and Trademark Office*